US009320200B2

(12) United States Patent
Van Amstel (10) Patent No.: US 9,320,200 B2
(45) Date of Patent: Apr. 26, 2016

(54) BALER AND METHOD OF BALING (75) Inventor: Leonardus Hendricus Maria Van Amstel, Geldrop (NL)

(73) Assignee: KUHN-GELDROP B.V., Geldrop (NL)

( * ) Notice: Subject to any disclaimer, the term of this patent is extended or adjusted under 35 U.S.C. 154(b) by 0 days.

(21) Appl. No.: 14/236,266

(22) PCT Filed: Jul. 26, 2012

(86) PCT No.: PCT/EP2012/003175
§ 371 (c)(1),
(2), (4) Date: Mar. 25, 2014

(87) PCT Pub. No.: WO2013/017229
PCT Pub. Date: Feb. 7, 2013

(65) Prior Publication Data
US 2014/0224135 A1 Aug. 14, 2014

(30) Foreign Application Priority Data

Aug. 3, 2011 (GB) .................................. 1113420.2

(51) Int. Cl.
*A01F 15/08* (2006.01)
*A01F 15/14* (2006.01)
*A01F 15/04* (2006.01)

(52) U.S. Cl.
CPC ................. *A01F 15/08* (2013.01); *A01F 15/04* (2013.01); *A01F 15/0825* (2013.01); *A01F 15/14* (2013.01); *A01F 15/145* (2013.01)

(58) Field of Classification Search
CPC ..... A01F 15/0825; A01F 15/14; A01F 15/04; A01F 15/08; A01F 15/145
USPC ........... 100/2, 3, 4, 8, 43, 50, 191, 192, 33 R; 56/341
See application file for complete search history.

(56) References Cited

U.S. PATENT DOCUMENTS

| 3,895,571 | A |   | 7/1975  | Freeman |
|-----------|---|---|---------|---------|
| 4,074,623 | A |   | 2/1978  | White |
| 4,108,062 | A |   | 8/1978  | White |
| 4,142,746 | A |   | 3/1979  | White |
| 4,577,553 | A |   | 3/1986  | Weidemann |
| 4,711,078 | A | * | 12/1987 | Schaible et al. ................ 56/341 |
| 5,123,338 | A | * | 6/1992  | Mathis ............................ 100/43 |
| 6,257,131 | B1 | * | 7/2001  | Wilkens et al. ................. 100/43 |
| 7,140,293 | B1 | * | 11/2006 | Rotole .................... A01F 15/12 100/33 R |
| 2006/0012176 | A1 | * | 1/2006 | Schoonheere ........ A01F 15/145 289/2 |
| 2012/0137901 | A1 |   | 6/2012 | Van Groenigen |

FOREIGN PATENT DOCUMENTS

EP 0 392 627 A1 10/1990
WO WO 2010/136501 A1 12/2010

OTHER PUBLICATIONS

International Search Report issued Jan. 2, 2013, in PCT/EP12/003175 filed Jul. 26, 2012.

* cited by examiner

*Primary Examiner* — Jimmy T Nguyen
(74) *Attorney, Agent, or Firm* — Oblon, McClelland, Maier & Neustadt, L.L.P.

(57) ABSTRACT

A baler apparatus includes a baling chamber including a channel including an inlet end and an outlet end, a reciprocating plunger adjacent the inlet end of the baling chamber that is operable to compress a body of bale material within the baling chamber, a binding device for binding the compressed body of bale material to form a bale, and at least one adjustable wall for adjusting the compression of the bale material during formation of a bale.

15 Claims, 5 Drawing Sheets

BALER AND METHOD OF BALING

CROSS-REFERENCE TO RELATED APPLICATIONS

This is a National Phase Application in the United States of International Patent Application PCT/EP2012/003175 filed Jul. 26, 2012, which claims priority on GB Application No. 1113420.2 of Aug. 3, 2011. The entire disclosures of the above patent applications are hereby incorporated herein by reference.

BACKGROUND OF THE INVENTION

1. Field of the Invention

The present invention relates to a baler and a method of baling, in particular but not exclusively for baling an agricultural crop.

2. Description of the Related Art

For efficient transport and storage, and to improve the keeping properties of the product, agricultural products like hay, straw and silage may be compressed into bales of a parallelepiped shape, which are known as 'square' bales. After the compression of the bale material the shape and the compression of the bale is maintained by binding the bale with twines that are looped around the compressed bale material. The ends of the twine are then knotted together.

Typically, compression of the bale material is performed by a reciprocating plunger press baler. A typical baler of this type is described in U.S. Pat. Nos. 4,074,623 and 4,142,746 to Hesston Corporation. This baler machine includes a baling chamber comprising an open-ended channel through which bale material is forced by a reciprocating plunger. The plunger is driven in a substantially linear direction between two end positions comprising respectively a withdrawn position in front of the baling chamber and an extended position in which it extends into the baling chamber. When the plunger is in the withdrawn position the baling chamber is loaded with the bale material to be compressed. The plunger is then driven into the baling chamber so that this new material is compressed against a body of compressed material already in the baling chamber. Any newly compacted material that is added to the already compacted material in the chamber is called a 'wad'. The friction of the compressed material with the walls of the baling chamber provides a resistive force allowing for compression of the new material that is introduced into the baling chamber in front of the plunger.

After compression, the newly compressed material and the compressed material already in the baling chamber are moved together towards the outlet end of the channel until the plunger reaches its fully extended end position. The plunger then moves in the opposite direction toward its withdrawn position so that the baling chamber can be reloaded with new material to be compressed.

The friction within the baling chamber between the already formed bale and the walls of the channel can be regulated for instance by pressing the side walls and/or the top panels of the baling chamber against the compressed material with different levels of force.

The bale is held in compression after leaving the machine by binding the bale with twines that are tied around the body of compressed material. In some machines, a single spool process is used in which each binding is formed with twine that is taken from a single spool and looped around the entire circumference of the bale, then tied with a single knot. Such a process is described in U.S. Pat. No. 3,895,571, which includes a mechanism for releasing the tension in the twine during knotting so as to avoid problems while knotting the twine.

Another example of a machine that uses a single spool process is described in EP0392627A. This machine includes a mechanism for reducing the bale pressure at the start of the bale forming process to allow the binding twine to slide more easily between the bale material and the previously formed bale that is still in the baling chamber.

Another machine that uses a single spool process is described in DE4031695A. This machine includes a mechanism for reducing the bale pressure at the start of the twine knotting process to allow the binding twine to be knotted more easily.

Other baling machines use a twin spool process in which each binding is formed using twines from two spools, which are tied with two knots at opposite ends of the bale. One advantage of the twin spool process is that the bale can be compressed to a higher compaction pressure because the twine does not have to be passed between the newly compacted bale and the previously formed bale. However, this increased compacting pressure also increases the risk of the twines breaking when the bale is ejected from the baling chamber. This problem does not arise with baling machines that use the single spool process, since the bale is compressed at a lower compacting pressure.

An example of a baling machine that uses the twin spool process is described in U.S. Pat. No. 4,577,553, which includes a mechanism for increasing the length of the bindings so that they are less likely to burst, particularly when using sisal twine.

The present invention is concerned particularly with machines that use the twin spool process. This twin spool binding process will now be described in more detail.

At the start of the baling process two lengths of twine from spools on opposite sides of the baling chamber are connected to one another by tying the ends of the twines together.

As the bale material is compacted in the baling chamber the spools feed twine to the baling chamber on either side of the bale material. On one side of the baling chamber the twine passes through the tip of a baling needle. When the body of bale material has reached its full length, between two successive compressing strokes, the needle brings the twine as a loop to the other side of the baling chamber. A knotter device then knots the twine, joining an end of the twine loop that was brought around the compressed bale by the needle to an end of the twine that was supplied by the spool on other side of the baling chamber (on the same side as the knotter). A second knot is also formed for the start of the next bale. The needle is then retracted and a new bale is started.

The pressure applied to the material in the baling chamber during the compression stroke is typically 3 to 4 bar for a bale with a typical compression surface of 90*120 cm. The knotted twine used in this type of baling machine typically has a breaking strength of 200 kgf. Six knotted twines can therefore hold about 6*2*200=2400 kgf. In a conventional bale with a compression surface of 90*120 cm this results in a holding pressure of only 2,2 bar. This places an upper limit on the compression pressure that can be applied to the bale. If a higher compression level is to be maintained, more binding twines have to be used.

There is generally some expansion of the bale as it is ejected from the channel of the baling chamber and this expansion has to be taken into account when designing the baling machine to ensure that the twines are able to maintain the compression of the bale without breaking. However, the amount of expansion is not uniform. Some materials such as dry straw and grass are more elastic than others and tend to expand more. There is therefore a greater risk that the twines will break when baling such materials.

To reduce the risk of breakage when baling highly elastic bale materials, the overall compression level is sometimes reduced. However, this reduces the density and mass of the bale, which is generally undesirable.

Alternatively, the twine loops tied around the compressed material can be made slightly longer than the circumference of the compressed bale while it is in the baling chamber. Then, when the bale leaves the baling chamber it expands to a size determined by the slightly greater length of the twine. Due to this expansion, the pressure in the bale falls to a value that can be withstood by the twines. However, this also has a negative impact on the mass and density of the bale and it results in a lower level of compression for all materials, including less elastic materials for which a lower level of compression is not needed.

Recently, the compression level that can be produced by baling machines that use the twin spool process has increased to typically about 6-10 bar, but the holding strength of the twine has hardly improved. The increased compression level places greater stress on the baling twines, particularly when binding materials that are relatively elastic, for example dry grass. We have found that with some materials and/or in certain weather conditions the pressure after expansion of the bale can be higher than the twines can withstand. As a result, we have found that the twines can break and the bales can then burst during or after leaving the baling chamber.

BRIEF SUMMARY OF THE INVENTION

It is an object of the invention to provide a baler and a method of baling that mitigate this problem and, in particular, that allow optimum compression of all bale materials and compensate for differences in the elasticity of those materials, while reducing the risk of twine breakage.

According to one aspect of the present invention there is provided a baler apparatus including a baling chamber comprising a channel having an inlet end and an outlet end, a reciprocating plunger adjacent the inlet end of the baling chamber that is operable to compress a body of bale material within the baling chamber, and a binding device for binding the compressed body of bale material to form a bale, the binding device including two spools that are configured to supply binding twine on opposite sides of the baling chamber, wherein the baling chamber has at least one adjustable wall for adjusting the compression of the body of bale material by controlling the pressure applied the body of bale material during formation of a bale, the apparatus being configured to reduce the pressure applied to the body of bale material during a final stage of the bale forming process and before binding of the bale to reduce the compression within part of the body of bale material.

By reducing the pressure applied to the body bale material during the final stage of the bale forming process, the tension of the binding twine after the bale leaves the baling chamber can be controlled as required, thereby reducing the risk if breakage if the bound bale expands either on leaving the baling chamber or subsequently. The tension in the baling twine can then be controlled according to the nature of the bale material. For example, the reduction in compression can be greater if the bale is made of relatively elastic material such as dry grass, or lower if the bale is made of less elastic material.

As the apparatus is configured to reduce the pressure applied to the body of bale material only during a final stage of the bale forming process and prior to binding, it provides the required reduction in the tension in the binding twine while allowing the majority of the bale to be formed at maximum compression. The bale weight and density can therefore be maintained at a high level, without increasing the risk of the bale bursting.

Advantageously, the apparatus is configured to reduce the pressure applied to the body of bale material when the body of bale material has reached 70-95% of the required bale length. The point at which the pressure is reduced can be varied according to factors such as the type of bale material and environmental conditions.

Advantageously, the apparatus is configured to reduce the pressure applied to the body of bale material by up to 50%. The amount of compression reduction can be varied according to factors such as the type of bale material and environmental conditions.

Advantageously, the apparatus is configured to reduce the compression with a front part of the body of bale material.

Advantageously, the apparatus is configured to reduce the pressure applied to a front face of the body of bale material.

Advantageously, the adjustable wall is configured to pivot about a pivot point that is located towards the inlet end of the baling chamber.

Advantageously, the baler apparatus includes an adjuster device for adjusting the position of the adjustable wall. This allows the position of the adjustable wall to be adjusted according to operating commands or in response to signals received from sensors in the baling chamber.

Advantageously, the baler apparatus includes a control device for controlling operation of the adjuster device. This allows the position of the adjustable wall to be adjusted automatically, or in response to control signals provided by the operator of the baler apparatus.

According to another aspect of the invention there is provided a method of baling bale material in a baler apparatus having a baling chamber including a channel with an inlet end and an outlet end, a reciprocating plunger adjacent the inlet end of the baling chamber, and a binding device, the method comprising activating the reciprocating plunger to compress a body of bale material in the baling chamber and adjusting at least one adjustable wall of the baling chamber to reduce the pressure applied to the body of bale material during a final stage of the bale forming process and thereby to thereby reduce the compression of the bale material within part of the body of bale material, supplying binding twine from spools on opposite sides of the baling chamber and binding the compressed body of bale material to form a bale.

Advantageously, the method includes reducing the compression of bale material when the body of compressed bale material has reached 70-100% of the required bale length.

Advantageously, the compression of bale material is reduced by up to 50%.

Advantageously, the method includes adjusting the position of the adjustable wall with an adjuster device.

Advantageously, the method includes controlling operation of the adjuster device with a control device.

BRIEF DESCRIPTION OF THE SEVERAL VIEWS OF THE DRAWINGS

An embodiment of the invention will now be described by way of example with reference to the accompanying drawings, wherein.

DETAILED DESCRIPTION OF THE INVENTION

Figure 1:
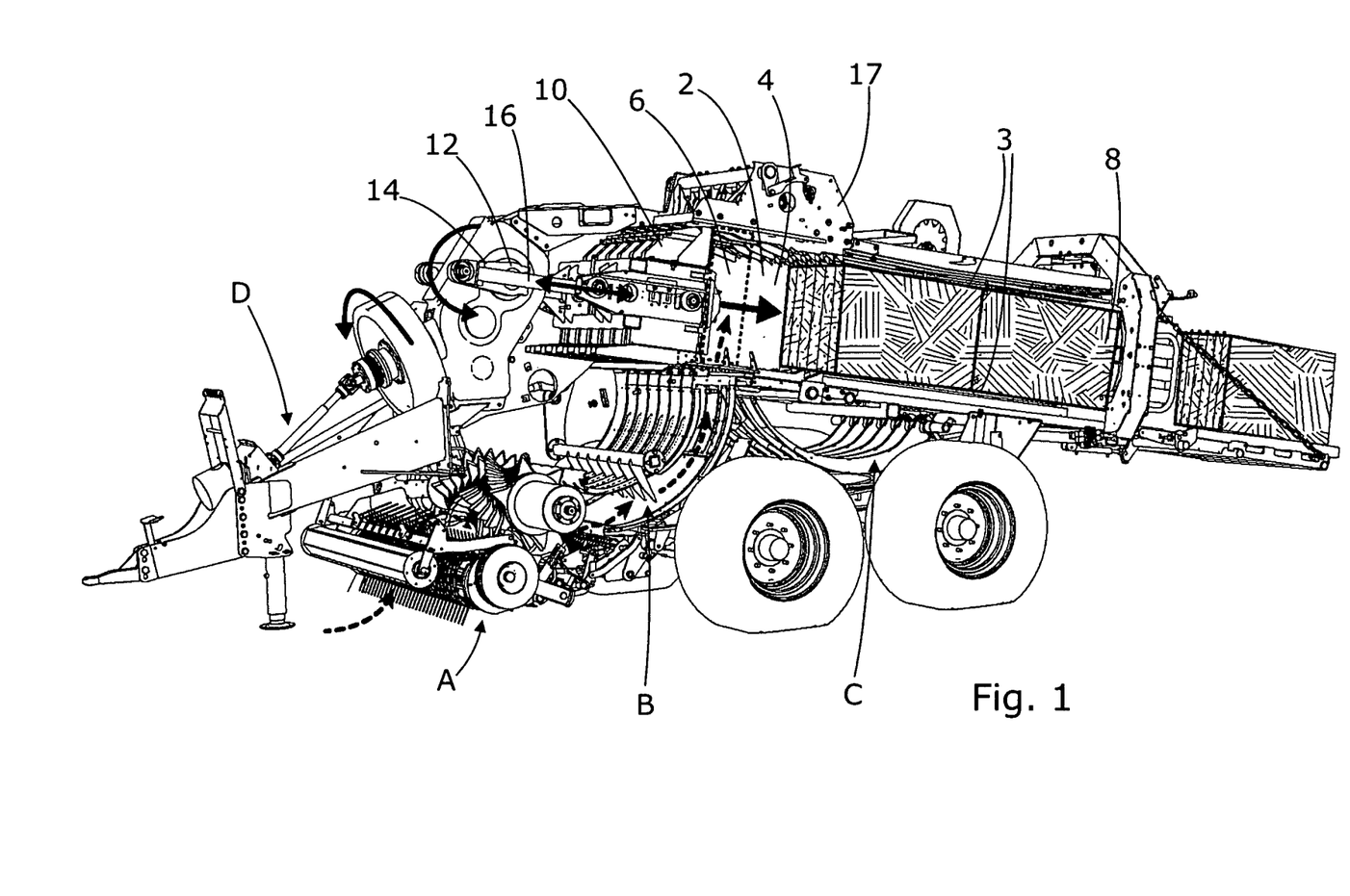
FIG. 1 is an isometric view showing the main components of a baling machine.

The baling machine or baler shown in FIG. 1 includes a baling chamber 2 that is defined by top and bottom plates 3 and two side walls 4, one of which has been omitted from the drawing to show the interior of the chamber 2. The baling chamber 2 comprises a channel having an inlet end 6 and an outlet end 8. At the inlet end 6, the channel is closed by a plunger 10 that can be driven into the baling chamber 2 in a reciprocating manner. In this example, the plunger 10 is driven from a rotating drive axle 12 via a pair of drive arms 14, 16. The baling machine also includes a binding device 17, for example as described in U.S. Pat. No. 4,074,623, for binding the bale with binding twine, comprising a plurality of twin spool binding devices 17', each including two spools 17'' opposite sides of the baling chamber 2.

In addition, the baling machine includes a pick up mechanism A for picking up cut bale material (for example grass and straw) from the ground, a feed mechanism B for feeding the bale material into the baling chamber 2, a set of needles C for feeding binding twine through the baling chamber and a drive mechanism D for transmitting drive to the drive axle 12 from the drive output of a towing vehicle (not shown). These components are all conventional and so will not be described in detail.

Figure 2A:
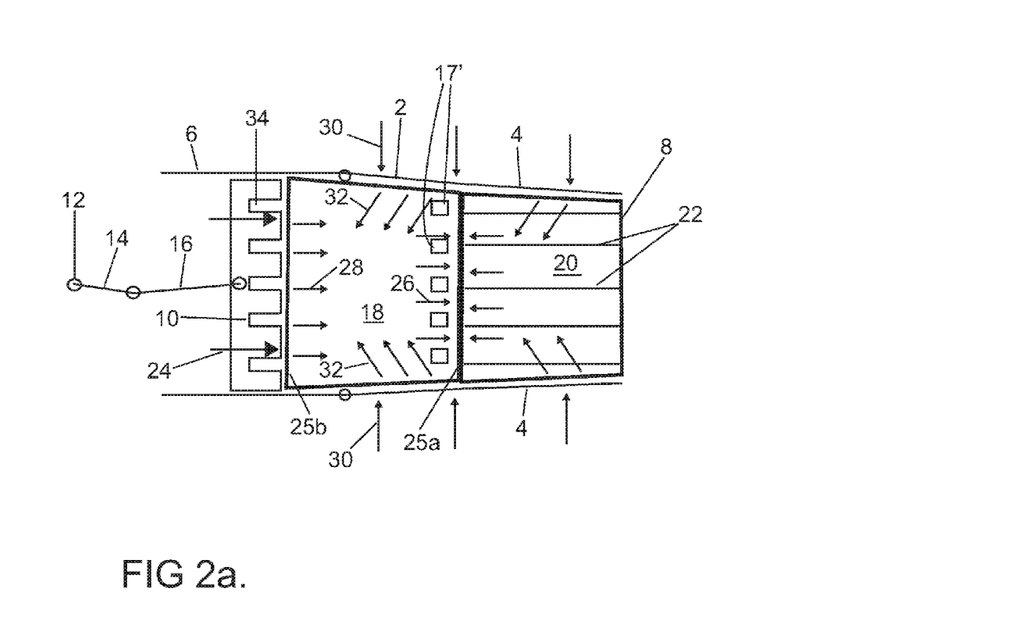
FIG. 2a is a schematic illustration from above of a prior art baling machine during compression of the bale material.
Figure 2B:
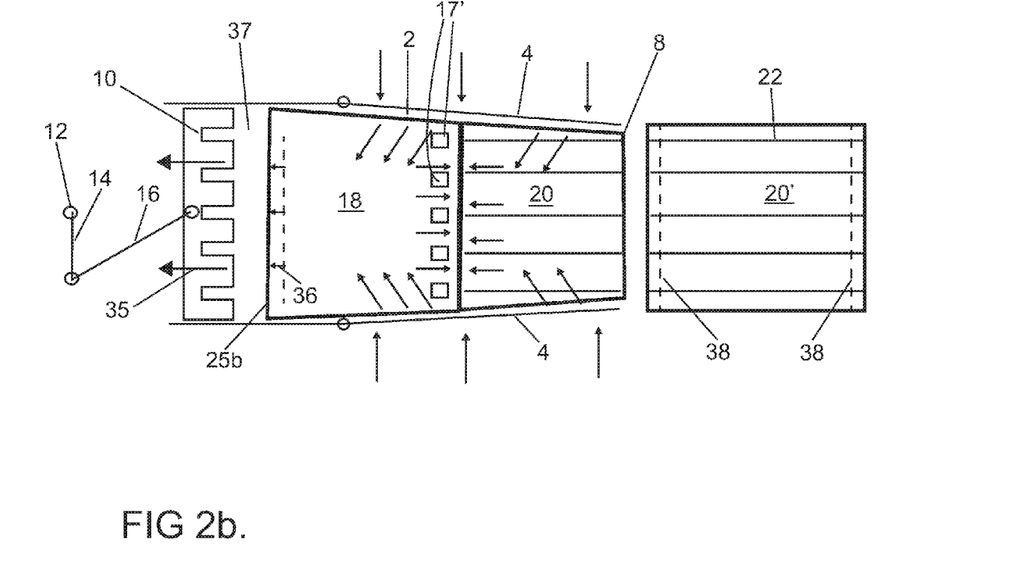
FIG. 2b is a schematic illustration from above of the prior art baling machine after withdrawal of the plunger and prior to binding of the bale material.

The prior art baling machine represented schematically in FIGS. 2a and 2b is substantially as described in U.S. Pat. No. 4,074,623, the contents of which are incorporated herein by reference. The baling machine includes a baling chamber 2 that is defined by two side walls 4, as well as by top and bottom plates (not shown). The opposed side walls 4 are inclined towards one another to provide a tapered channel and can be adjusted to different degrees of taper. The baling chamber 2 thus consists of a channel having an inlet end 6 and an outlet end 8. At the inlet end 6, the channel is closed by a plunger 10 that can be driven into the baling chamber 2 in a reciprocating manner. In this example, the plunger 10 is driven from a rotating drive axle 12 via a pair of drive arms 14, 16.

The baling machine of FIGS. 2a and 2b is shown in operation, containing within the baling chamber 2 a compressed but unbound body 18 of bale material and a compressed and bound bale 20. The completed bale 20 is bound with binding twine 22. In this example, five loops of binding twine 22 are used, which extend around the top, bottom, front and rear faces of the bale 20.

In FIG. 2a the baling machine is shown during a compression stroke, in which the plunger 10 is driven forwards as depicted by arrows 24 into the baling chamber 2. As a result of this movement of the plunger 10, a body 18 of bale material that has been loaded into the baling chamber 2 is driven forwards within the baling chamber 2 against the end face of the already formed bale 20. The body 18 of bale material is thus compressed both longitudinally and transversely: longitudinal compression resulting from being pressed by the plunger 10 against the end face of the already formed bale 20 (and from the frictional forces acting on the bale 20), and transverse compression of the body 18 resulting from it being forced between the converging side walls 4. The frictional force on the body 18 of bale material can be regulated by adjusting the positions of the side walls 4 and/or the top and bottom plates as indicated by arrows 30.

During compression, the front and rear faces 25a, 25b of the body 18 of bale material are driven forwards by the plunger 10 as depicted by the arrows 26,28. The resulting compression of the bale material is indicated by diagonal arrows 32. This process is repeated until the body 18 of bale material has reached the required size.

Once the body 18 of bale material has reached the required size, the bale material is bound with baling twine. A set of needles (not shown) carrying the binding twines are extended through slots 34 in the face of the plunger 10 and the twines 22 are then tied around the bale. The binding and knotting processes may for example be substantially as described in U.S. Pat. No. 4,074,623.

After the bale material has been bound, the plunger 10 withdraws as illustrated by arrows 35 in FIG. 2b so that bale material for the next bale can be fed into the baling chamber. As the plunger withdraws, the rear face 25b of the body 18 of bale material recovers slightly and expands a short distance rearward as depicted by arrows 36. This rearward expansion of the body 18 of bale material is limited by the binding twines 22 that have been tied around the body 18 of bale material and increases the tension in the binding twines.

The next bale is then formed by introducing bale material into the gap 37 between the plunger 10 and the rear face 25b of the bale that has just been formed, then compressing the material by reciprocating movement of the plunger 10. This process is repeated as necessary to increase the size of the compressed body of bale material. As the process is repeated, the bale 20 that has just been formed is pushed along the channel towards the downstream end 8 of the baling chamber 2, and the previously formed bale 20' is ejected from the downstream end of the baling chamber 2 onto the ground.

When the bale 20' is ejected from the baling chamber the compressive forces acting on the front and rear faces of the bale are removed, allowing the bale 20' to expand against the tension of binding twines 22. The overall length of the bale 20' therefore increases slightly, the unexpanded size of the bale 20' being indicated by broken lines 38. This increases the tension in the twines 22. As a result of this partial decompression of the bale the load carried by the twines 22 as the bale is expelled from the baling chamber 2 is significantly less than the pressure that was applied to the bale material by the plunger 10 (for example about 2.2 bar as compared to a compacting pressure of 4-10 bar).

Figure 3A:
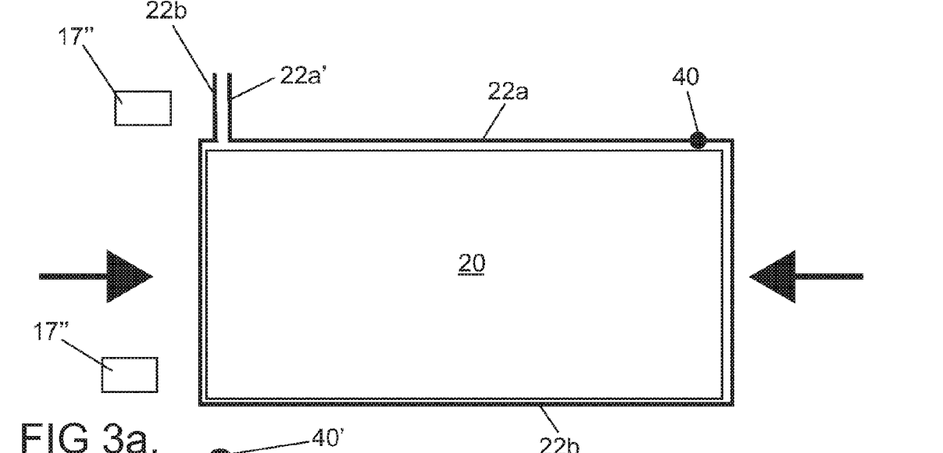
FIG. 3a is a schematic illustration of a prior art bale bound with baling twine, before the ends of the twine are tied.
Figure 3B:
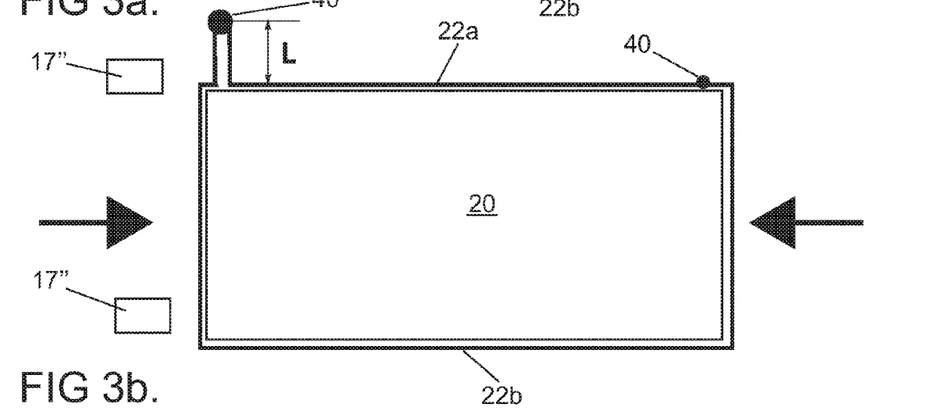
FIG. 3b is a schematic illustration of the prior art bale, after the ends of the baling twine are tied.
Figure 3C:
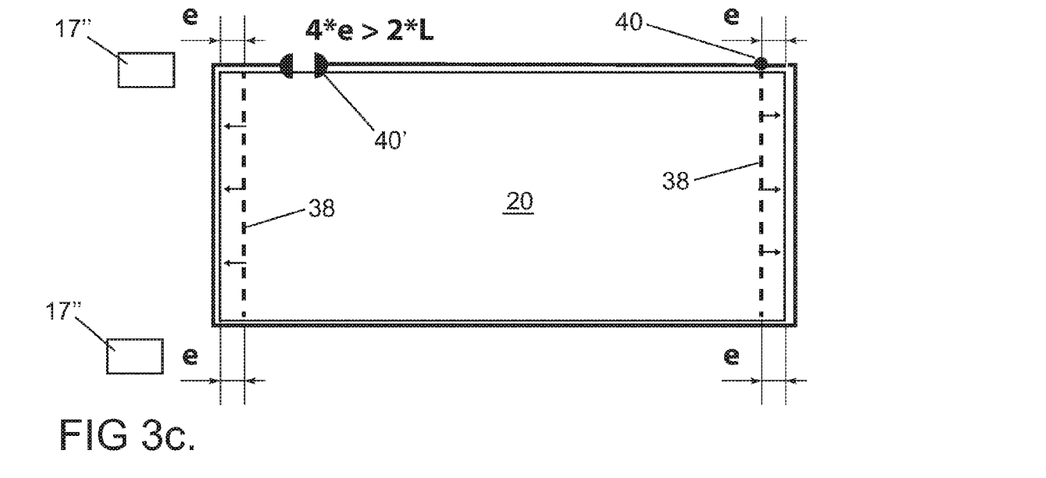
FIG. 3c is a schematic illustration of the prior art bale after the bale has expanded, causing breakage of the baling twine.

The prior art binding process is illustrated again in FIGS. 3a to 3c. In FIG. 3a, the bale 20 is shown in a compressed state, with two twines 22a, 22b forming a loop around the bale. First ends of the twines have been tied together forming a first knot 40. The second ends 22a', 22b' of the twines have not yet been tied together.

In FIG. 3b the bale 20 is shown after the second ends of the twines 22a, 22b have been tied together forming a second knot 40'. An extra length L of twine is required by the knotting device, which is released after the knot 40' has been tied. Therefore, when both ends of the twine are released from the knotting device the total length of the twine binding increases by 2L, which slightly reduces the tension in the binding.

When the bale 20 is ejected from the baling chamber, both ends of the bale expand by a distance e as shown in FIG. 3c, the original positions of the ends of the bale being depicted by broken lines 38. This causes the circumference of the bale to increase by a length of 4*e. If the increase in circumference is greater than the additional length of twine released by the knotting device, that is if 4*e>2*L, the overall tension in the twine binding will increase, which may result in failure of the twine forming the binding.

Figure 4A:
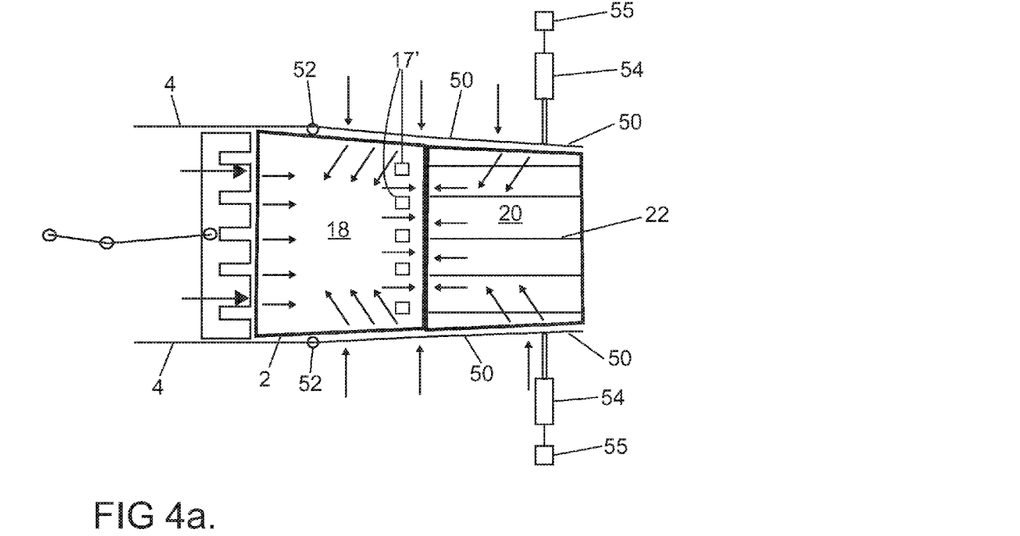
FIG. 4a is a schematic illustration of a baling machine according to an embodiment of the invention during compression of the bale material.
Figure 4B:
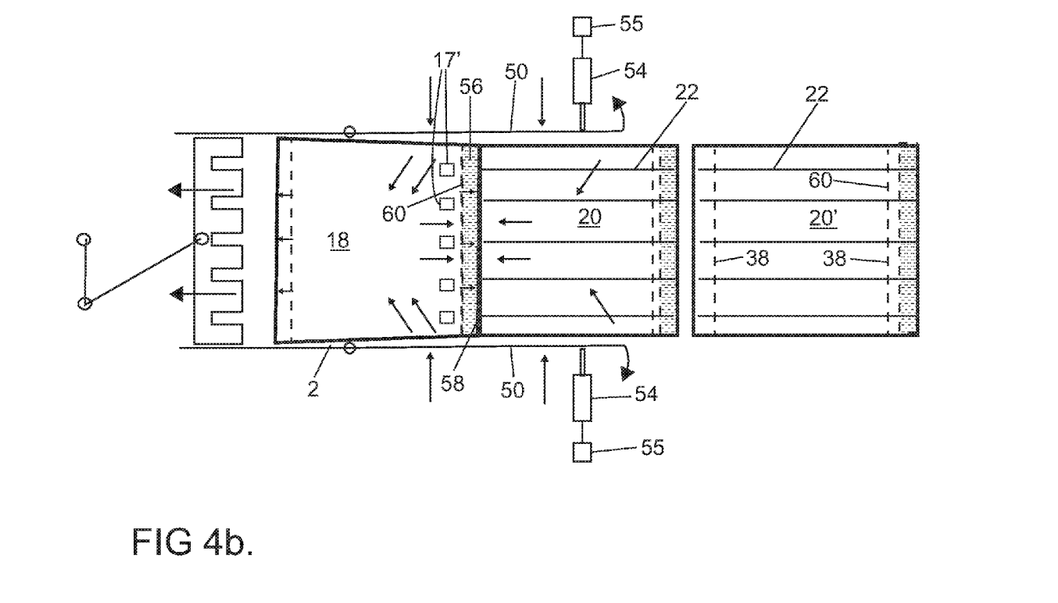
FIG. 4b is a schematic illustration of the baling machine after withdrawal of the plunger for binding.

A baling machine according to an embodiment of the invention is shown in FIGS. 4a and 4b. This machine is similar in most respects to the prior art machine shown in FIGS. 1, 2a and 2b and the foregoing description therefore applies in part also to this machine. As in the prior art machine, the side walls 4 include adjustable wall sections 50, each adjustable wall section 50 being mounted for pivoting movement about a pivot joint 52 at the upstream edge of the wall section. An adjuster device 54 is connected to each wall 50, the adjuster device 54 being operable to adjust the position of the wall 50 and thereby to adjust the frictional force applied to the already-formed bale 20 as it moves through the baling chamber 2. Alternatively or in addition, the adjuster devices 54 may be configured to adjust the positions of the top and/or bottom walls of the baling chamber. The adjuster devices 54 may for example be hydraulically or electrically driven and are controlled by a control device 55, which can operate automatically or in response to control signals provided by the operator.

In the invention, the adjuster devices 54 can be actuated to actively control the frictional force between the bale 20 and the walls of the baling chamber 20. Adjusting the positions of the side walls 50 controls the frictional force between the bale 20 and walls of the baling chamber. This in turn influences the compressive force applied to the body 18 of bale material as it is compressed within the baling chamber 2 and thus controls the longitudinal compression of the bale material.

During the initial part of the bale forming process, the side walls 50 are located as shown in FIG. 4a to provide a tapered channel through the baling chamber 2. In this position the walls provide a high level of friction with the bale 20, thus ensuring maximum compression of the body 18 of bale material.

During the final stage of the bale forming process (for example, during compression of the final wad of the bale material), the side walls 50 can be repositioned slightly further apart as shown in FIG. 4b, thereby reducing the level of friction and allowing the bale 20 to advance more easily towards the downstream end of the baling chamber 2. This reduces the longitudinal compression of the body 18 of bale material, particularly in the region 56 adjacent the front face 58 of the body 18 of bale material. The body 18 of bale material is therefore allowed to expand longitudinally prior to binding, the position of the front face of the body before expansion being indicated by broken line 60. This pre-expansion of the bale material prior to binding reduces the tension in the baling twine 22 to compensate for the elasticity of the bale material.

It should be noted that the amount of pre-expansion of the body 18 of bale material depends on the elasticity of the bale material. There will thus be a larger amount of pre-expansion when the bale material is highly elastic than when it has a lower degree of elasticity. The amount by which the tension in the binding twines 22 is reduced will also therefore depend on the elasticity of the bale material, thus ensuring that the reduction in tension is related to the type of bale material.

When the completed bale 20' is ejected from the baling chamber the compressive forces acting on the front and rear faces of the bale are removed, allowing the bale 20' to expand against the tension of binding twines 22. The overall length of the bale 20' therefore increases slightly, the unexpanded size of the bale 20' being indicated by broken lines 38.

Figure 5A:
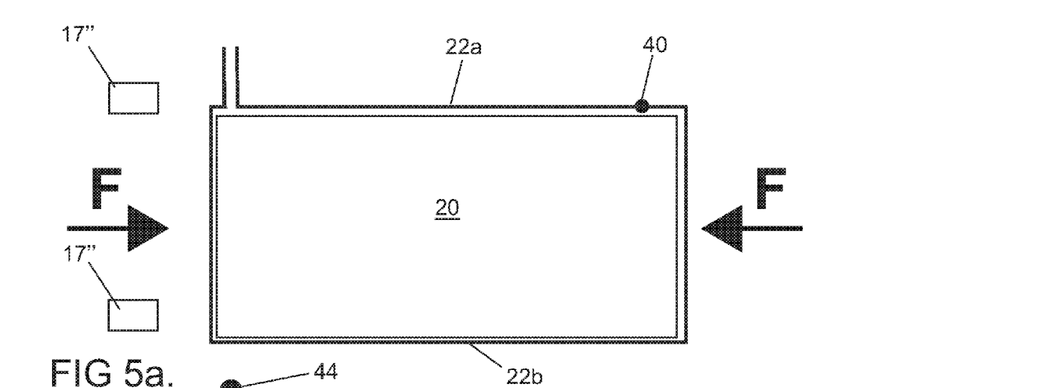
FIG. 5a is a schematic illustration of a bale according to an embodiment of the invention, the bale being bound with baling twine, before the ends of the twine are tied.
Figure 5B:
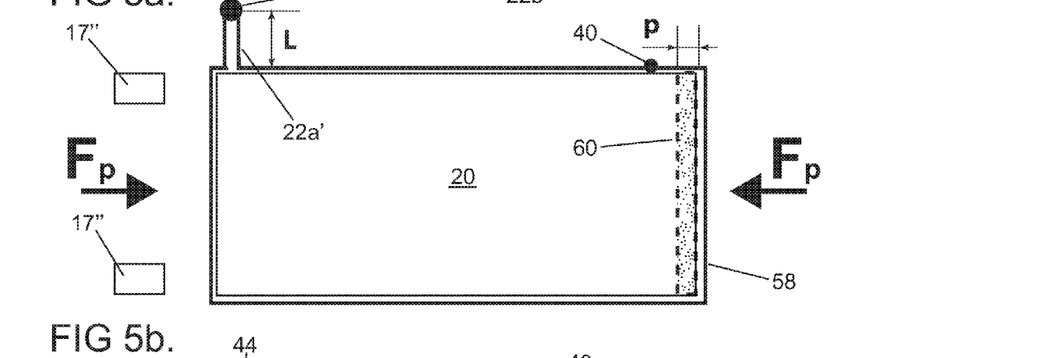
FIG. 5b shows the bale of the present invention after pre-expansion has taken place, before the ends of the baling twine are tied.
Figure 5C:
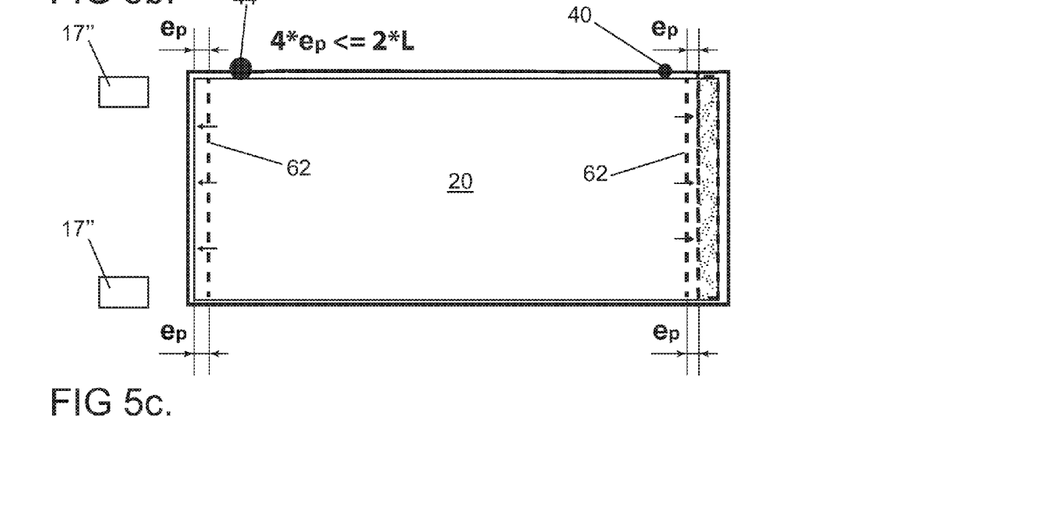
FIG. 5c shows the bale of the present invention after pre-expansion has taken place and after the ends of the baling twine have been tied.

The result of this baling method is further illustrated in FIGS. 5a to 5c. In FIG. 5a the baling twines 22a, 22b have been looped around the bale 20 and first ends of the twines have been tied together forming a first knot 40. At this stage the bale 20 is subjected to the full compressive force F within the baling chamber.

In FIG. 5b pre-expansion of the bale 20 has taken place as a result of adjusting the positions of the side walls 50 to allow the already formed bale to travel further along the channel. The bale 20 is thus subjected to a reduced compressive force $F_p$ on its front face 58. The size of the bale 20 prior to expansion is indicated by the broken line 60 and the expansion length is indicated by the letter p. After expansion, the second ends 22a', 22b' of the twines are tied together forming a second knot 44.

When the bale 20 is ejected from the baling chamber, both ends of the bale expand by a distance $e_p$ as shown in FIG. 5c, the original positions of the ends of the bale being depicted by broken lines 62. This causes the circumference of the bale to increase by a length equal to $4*e_p$. In this case, because the bale 20 has already expanded by a length p prior to binding, the increase in circumference after binding can be equal to or less than the additional length of twine released by the knotting device, that is $4*e_p \leq 2*L$. Therefore, an overall increase in the tension of the twine binding can be avoided, which helps to prevent failure of the twine or knots forming the binding.

The reduction in the compression level prior to binding is preferably adjustable so as to adapt the process to the expansion properties of the bale material. For relatively inelastic materials that expand only slightly after compaction (e.g. silage), the required pressure reduction will be small, whereas for more elastic materials that tend to expand a lot after compaction (e.g. dry straw and/or materials that are baled in very dry conditions) the required reduction in pressure will be substantial (e.g. 30-50% at compression levels of 6-10 bar).

Preferably, the point at which the reduction of compression pressure begins is related to the length of the bale and can be adjusted to start at any point from about 70% to 95% of the total bale length, or up to triggering of the knotting device to close the twine loop after the last compression stroke. In this last option, only one compaction stroke will be performed at the reduced compaction pressure.

The invention claimed is:

1. A baler apparatus comprising:
   a baling chamber comprising:
   a channel having an inlet end and an outlet end,
   a reciprocating plunger adjacent the inlet end of the baling chamber that is operable to compress a body of bale material within the baling chamber, a plurality of twin spool binding devices for binding the compressed body of bale material to form a bale, each twin spool binding device including two spools that are configured to supply binding twine on opposite sides of the baling chamber and a knotting device for knotting together the twines supplied by the two spools to form a first knot at a first end of the bale and a second knot at a second end of the bale, and at least one adjustable wall for adjusting compression of the body of bale material by controlling pressure applied the body of bale material during formation of a bale, the baling apparatus being configured to reduce the pressure applied to the body of bale material during a final stage of the bale forming process and before triggering of the knotting device to form the second knot to bind the bale, to allow longitudinal expansion of the body of bale material and reduce compression within part of the body of bale material.

2. A baler apparatus according to claim 1, further configured to reduce the pressure applied to the body of bale material when the body of bale material has reached 70-95% of a required bale length.

3. A baler apparatus according to claim 1, further configured to reduce the pressure applied to the body of bale material by up to 50%.

4. A baler apparatus according to claim 1, further configured to reduce the compression with a front part of the body of bale material.

5. A baler apparatus according to claim 1, further configured to reduce the pressure applied to a front face of the body of bale material.

6. A baler apparatus according to claim 1, wherein the adjustable wall is configured to pivot about a pivot point located towards the inlet end of the baling chamber.

7. A baler apparatus according to claim 1, further comprising an adjuster device for adjusting a position of the adjustable wall.

8. A baler apparatus according to claim 7, further comprising a control device for controlling operation of the adjuster device.

9. A method of baling bale material in a baler apparatus including a baling chamber including a channel with an inlet end and an outlet end, a reciprocating plunger adjacent the inlet end of the baling chamber, and a plurality of twin spool binding devices, the method comprising:

activating the reciprocating plunger to compress a body of bale material in the baling chamber;

adjusting at least one adjustable wall of the baling chamber to reduce pressure applied to the body of bale material during a final stage of the bale forming process and to thereby allow longitudinal expansion of the body of bale material and reduce compression of the bale material within part of the body of bale material; and forming a plurality of bindings that bind the compressed body of bale material to form a bale, wherein each bind in is formed supplying binding twine from two spools on opposite sides of the baling chamber and knotting the twines together to bind the compressed body of bale material to form a bale, and wherein each binding includes a first knot at a first end of the bale and a second knot at a second end of the bale.

10. A method according to claim 9, further comprising reducing the pressure applied to the body of bale material when the body of bale material has reached 70-95% of a required bale length.

11. A method according to claim 9, wherein the pressure applied to the body of bale material is reduced by up to 50%.

12. A method according to claim 9, further comprising adjusting a position of the adjustable wall with an adjuster device.

13. A method according to claim 12, further comprising controlling operation of the adjuster device with a control device.

14. A baler apparatus according to claim 1, wherein the adjustable wall is mounted by pivoting movement about a pivot joint at an upstream end of the adjustable wall.

15. A method according to claim 9, wherein the adjustable wall is mounted by pivoting movement about a pivot joint at an upstream end of the adjustable wall.

* * * * *